(No Model.)
L. C. BEAUDET.
EUCHARISTIC WATER CRUET.
No. 500,843. Patented July 4, 1893.
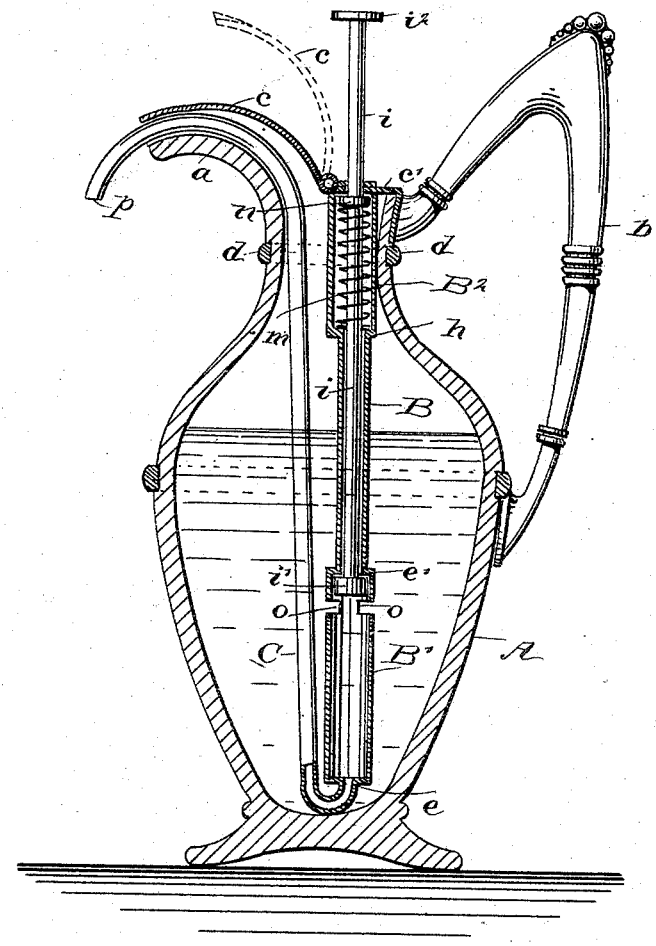

UNITED STATES PATENT OFFICE.

LEO C. BEAUDET, OF MOUNT VERNON, NEW YORK.

EUCHARISTIC WATER-CRUET.

SPECIFICATION forming part of Letters Patent No. 500,843, dated July 4, 1893.

Application filed February 2, 1893. Serial No. 460,660. (No model.)

*To all whom it may concern:*

Be it known that I, LEO C. BEAUDET, of Mount Vernon, in the county of Westchester and State of New York, have invented a new and useful Improvement in Safety Eucharistic Water-Cruets, of which the following is a full, clear, and exact description.

My invention relates to an improved device from which to dispense an exact minimum of water for admixture with wine at the offertory of the eucharistic sacrifice.

In the celebration of the mass according to the liturgy of the Catholic church, it is obligatory on the part of the celebrant to pour at the offertory a few drops of water into the wine used on the occasion. The quantity of wine necessary for the validity of the eucharist is small, and the proportion of water to be added thereto is graduated by drops to avoid a violation of the prescribed formula, as in accordance with the established rule it is absolutely essential that a proper preponderance in volume of the wine shall exist to attain the validity of the sacrifice.

The object of my invention is to provide a small, shapely and convenient receptacle or cruet, which will contain mechanism of a simple construction that will afford means by manipulation to exactly graduate the discharge of pure water from the cruet, in proper quantity for the sacred service hereinbefore mentioned.

A further object is to adapt the contained mechanism of the cruet for a discharge of a gaged quantity of water by one impulse, or permit the expulsion of the desired amount of water from the cruet by successive drops, and also to furnish the vessel with a lid that is hinged upon the upper portion of the cruet body, and adapted to close its aperture in a manner to permit a pouring discharge of the contained water, which is also necessary at certain intervals in the celebration of the sacramental mass.

For the purposes stated, my invention comprises a suitably formed vessel adapted for pouring from its lip-shaped spout by manipulation of its handle. It further comprehends the provision of efficient mechanism within the vessel, adapted for manipulation from above the cruet by pressure, to discharge a predetermined quantity of liquid from the vessel through a part of the mechanical device, and further consists in the construction and combination of parts, as is hereinafter described and claimed.

Reference is to be had to the accompanying drawing in which the figure is a side view, partly in vertical section, of the cruet and contained mechanism.

The form represented for the vessel or cruet A is convenient and appropriate, but it is not imperative that this particular design be adhered to in the production of the vessel; it is essential, however, that there be a pouring lip such as $a$ provided therefor, and that a handle in bow form similar to the part $b$, should be projected from the body of the cruet oppositely from the lip $a$. There is a lid $c$, provided, which is shaped to permit its edges to fit closely upon the upper edge of the pouring lip $a$, the transverse edge of the lid which is nearest to the handle $b$, having a hinged connection with a fixed cap-piece $c'$, shaped to cover the portion of the aperture in the cruet that is not sealed by the lid when the latter is in a closed condition, the attachment of said cap-piece being by preference effected as represented, consisting in a securing band $d$ that encircles the neck of the cruet below the handle $b$, and is affixed to an exterior depending skirt portion of the cap-piece, the stricture of the band on the cruet serving to maintain the part $c'$ in firm connection with the cruet top. At the transverse center of the cap-piece $c'$ the upper end of a cylindrical barrel B is firmly secured, said barrel being hung therefrom in a perpendicular position, its length being so proportioned to the depth of the cruet internally that its lower end will be nearly in contact with the bottom wall of the cruet, a sufficient space intervening to allow the bent lower end of a pipe C to be there located, and have an intersecting engagement with the lower end of the barrel to which it is affixed, as at $e$. The barrel B is reduced in diameter at a proper distance from each end, thus producing a shoulder or offset in bore near its lower end as at $e'$, and near its upper end as at $h$, the reduced part of the barrel which lies between these shoulders serving as a guide for a plunger rod $i$, as will be further explained. That portion B' of the barrel B which is located between the bottom wall of said barrel and the shoulder $e'$, is made of correct dimensions to adapt it to serve as a measure of quantity for the modicum of water that is to be expelled from the cruet, its length and caliber being such that when it is filled to a certain point, as will be further explained, the amount of water contained will exactly represent the quantity required to dilute the sacramental wine a proper degree. The plunger rod $i$ is a necessary part of the mechanism and is made cylindrical in its body, and of such a relative diameter as will permit it to loosely fit within the diametrically reduced portion of the barrel B. On the lower end of the rod $i$ a plunger head $i'$ is secured, which is introduced within the cylinder B' and diametrically proportioned to slide water tight from end to end thereof. Such a length is given to the rod $i$ as will allow its upper portion to project a proper distance above the cap-piece $c'$ through which it is extended, a perforation in said part $c'$ being formed of a proper size to receive the rod and permit its free reciprocation therein. A spiral spring $m$ is placed on the rod $i$, which spring is introduced within the spring casing $B^2$ which is the part of the barrel B that is included between the upper shoulder $h$ and the lower side of the cap-piece $c'$, said casing being of about the same caliber as the cylinder B'. On the rod $i$ a collar $n$ is formed or secured, which is within the chamber $B^2$ and serves as an abutment for the upper end of the spiral spring $m$ that below has impinging contact with the shoulder $h$ of the barrel B. On the upper terminal of the rod $i$ a push button or enlargement $i^2$ is secured, which is conveniently located to receive pressure from the thumb or finger of the manipulator.

The cylinder B' is apertured as at $o$, for the free admission of water from the cruet A into the cylinder, said aperture or apertures being placed at a point near the lower face of the plunger head $i'$ when the latter is in its normal position, or elevated by the force of the spring $m$, so as to impinge its upper surface on the shoulder $e'$.

The discharge pipe C is curved at its lower end to extend it upwardly from the lower terminal of the cylinder B' to a point near the lip $a$ of the cruet, where it is curved outwardly so as to conform with the upper surface of said lip, upon which the curved part of the pipe is imposed, and the end portion of the latter extending beyond the lip $a$ is curved downwardly to adapt it to deliver the liquid from its open end $p$ into a chalice or other receptacle that may be provided.

In use, the cruet A is filled with pure water which has been blessed for the service, and when the celebrant admixes the wine and water, the push button $i^2$ is pressed upon to depress the plunger head $i'$, and as water from the cruet A has filled the cylinder B', it will be apparent that a proper pressure will expel an amount of the water from the pipe C that will correspond with the contents of the cylinder. The depression of the plunger head $i'$ serves to compress the spring $m$, and a release of pressure on the push button or enlargement $i^2$ will permit said spring to resume its expanded condition, thus elevating the rod $i$ and its plunger head so as to permit another charge of water to enter the cylinder B'.

Should it be desired to measure water or other liquid with exactitude as it is expelled from the pipe C, a graduated pressure should be applied to the push button $i^2$, which will cause a dropping discharge of the liquid from said pipe, which discharge may be the entire contents of the cylinder B', or a portion of the liquid therein.

It will be seen that if a part of the contents of the cruet A is needed for purposes of purification during the celebration of the eucharistic mass, this can be conveniently decanted therefrom by an elevation of the lid $c$ and pouring of the contents over the lip $a$.

Having thus fully described my invention, I claim as new and desire to secure by Letters Patent—

1. The combination with a portable vessel open at its top and sealed with a lid, of a liquid-expelling device in said vessel, having a barrel, a plunger therein, and a tube adapted to discharge the liquid in drops, substantially as described.

2. The combination with a cruet having a lip at one side of its top opening, of a liquid-receiving and expelling device and a discharge pipe therefor, which will discharge a measured modicum of the liquid over the lip, substantially as described.

3. The combination with a cruet having a lip at one side of its top opening, a fixed cap-piece covering a part of said opening and a hinged lid covering the lip and the other part of said opening, of a liquid receiving and expelling device in the cruet, projected above its cap-piece and also over the lip, and adapted by manipulation to discharge a modicum of liquid from the cruet by a single expulsion or by successive drops, substantially as described.

4. The combination with a cruet having a lip at one side of its top aperture, a handle opposite said lip, a fixed cap-piece covering part of the aperture, and a hinged lid over the lip, of a cylindric barrel contracted in diameter intermediately of its ends forming a liquid cylinder at its lower end and a spring casing at its upper end, and a rod guide between the cylinder and casing, a pusher rod in said barrel, a plunger head on the rod adapted to slide water-tight in the liquid cylinder, the latter being of a predetermined capacity and laterally apertured near its upper end, a spring in the case adapted by expansion to elevate the rod and its head, and a push piece on the rod above the cruet, substantially as described.

LEO C. BEAUDET.

Witnesses:
WM. P. PATTON,
C. SEDGWICK.